(12) United States Patent
Stowell

(10) Patent No.: US 6,802,440 B1
(45) Date of Patent: Oct. 12, 2004

(54) COMBINATION BACKREST AND STORAGE COMPARTMENT FOR A MOTORCYCLE AND THE LIKE

(76) Inventor: Ronnie L. Stowell, 5015 Shaman Ct., Bakersfield, CA (US) 93312

( * ) Notice: Subject to any disclaimer, the term of this patent is extended or adjusted under 35 U.S.C. 154(b) by 121 days.

(21) Appl. No.: 10/302,335

(22) Filed: Nov. 21, 2002

(51) Int. Cl.[7] .................................................. B62J 9/00
(52) U.S. Cl. ........................ 224/413; 190/110; 190/111; 190/112; 190/127; 224/275; 224/427; 224/428; 224/572
(58) Field of Search ................................ 224/275, 412, 224/413, 419, 427, 428, 572; 280/727, 769; 296/37.1; 383/38, 119; 190/109–112, 127

(56) References Cited

U.S. PATENT DOCUMENTS

| | | | | |
|---|---|---|---|---|
| 1,468,816 A | * | 9/1923 | Johnson | 190/127 |
| 2,585,745 A | * | 2/1952 | Crosby | 190/111 |
| 3,523,637 A | * | 8/1970 | Stec | 383/119 |
| 3,970,345 A | | 7/1976 | Holcomb | |
| 4,003,508 A | * | 1/1977 | Hoops | 224/413 |
| 4,125,213 A | * | 11/1978 | Watkins | 224/413 |
| 4,266,703 A | | 5/1981 | Litz | |
| 4,269,335 A | | 5/1981 | LaRose | |
| 4,447,088 A | | 5/1984 | Bodlovic | |
| 4,466,660 A | | 8/1984 | Mabie | |
| 4,529,069 A | * | 7/1985 | March | 190/109 |
| 5,518,291 A | | 5/1996 | Shaide | |
| 6,123,239 A | * | 9/2000 | Lovitt | 224/275 |
| 6,491,193 B2 | * | 12/2002 | Dudek et al. | 224/413 |
| 6,533,152 B1 | * | 3/2003 | Dischler | 224/427 |

* cited by examiner

Primary Examiner—Gary E. Elkins
(74) Attorney, Agent, or Firm—LaValle D. Ptak

(57) ABSTRACT

A combination backrest and storage compartment for a motorcycle or the like includes a bag made of flexible material, dimensioned to fit in the space between the driver's seat and the sissy bar of the motorcycle. A rigid frame is removably located within the bag, and the front of the frame is connected to the back of the frame by an elongated rigid brace. A flexible strap member is attached to the bag and extends around the front of the bag to allow it to be releasably secured to the sissy bar to pull the bag, and the frame located within the bag, rearwardly into tight engagement with the sissy bar. This secures the combination bag and storage compartment onto the motorcycle. A padded lumbar support backrest is attached to the outside of the bag adjacent the driver's seat.

26 Claims, 6 Drawing Sheets

COMBINATION BACKREST AND STORAGE COMPARTMENT FOR A MOTORCYCLE AND THE LIKE

BACKGROUND

Motorcycles, mopeds and motorized scooters are in widespread use as a mode of transportation, both for commuting and recreational use. Motorcycles, in particular, are becoming increasingly popular. Many such motorcycles are designed with a driver's or operator's seat generally located slightly to the rear of the center of the motorcycle, with a raised passenger seat, separate from or attached to the driver's seat, located substantially over the rear wheel of the motorcycle. Frequently, a vertical upright support or what is known as a "sissy bar" is located to the rear of the passenger seat to provide a backrest for the passenger.

The operator or driver of a motorcycle, however, typically is not provided with a backrest or lumbar support. The driver's seat is contoured to fit the bottom of the driver; but the driver or operator of the motorcycle, or similar vehicle, must always be sitting upright straddling the seat, with both arms extended to allow the hands to hold onto the handlebars. Little or no back support is provided by the typical motorcycle operator's seat.

When the driver or operator of a motorcycle is riding unaccompanied by a passenger, the operator frequently attaches duffle bags, sleeping bags, or other items, by means of ropes, stretchable cords and the like to the rear seat and the sissy bar, since this is a convenient location for carrying various articles, particularly on long trips. If articles such as sleeping bags and the like are strategically positioned on the passenger seat, it is possible to arrange them in such a manner to provide some modicum of back support for the operator of the motorcycle. The degree of comfort and the support provided is entirely dependent upon the shape and arrangement of the items which are secured by the operator to the rear seat position on the motorcycle. This does not provide a consistent back support for the operator.

The Shaide U.S. Pat. No. 5,518,291 is directed to an attempt to solve the backrest problem for a motorcycle operator, when the operator is riding without a passenger. This patent is directed to a removable and adjustable backrest and storage compartment for a motorcycle. The storage compartment is a substantially rigid box, which is placed on the rear seat of the motorcycle. The compartment is stabilized by side panels extending downwardly past the sides of the seat and rearwardly past the sissy bar of the motorcycle. A provision is made for attaching this compartment, which has a lid on its top, to the sissy bar. On the front of the storage compartment, an adjustable cushioned backrest is provided; and this backrest can be moved back-and-forth along a track to a desired position, and then secured in place. The backrest and storage compartment are an integral assembly made of rigid materials. The entire assembly may be removed from the motorcycle when use of the rear seat for a passenger is desired. The strap for attaching the combination storage compartment/backrest of the Shaide patent to the sissy bar is attached to the rear or back of the storage compartment to hold the back side or rear of the compartment tightly against the sissy bar.

The Lizt U.S. Pat. No. 4,266,703; Larose U.S. Pat. No. 4,269,335; Bodlovic U.S. Pat. No. 4,447,088 and Mabie U.S. Pat. No. 4,466,660 all are directed to various types of backrests or luggage racks for motorcycles. All of these patents disclose either a movable backrest or a luggage compartment with a backrest on it, or a combination of the two. The devices of all of these patents, however, require some type of frame, which must be bolted onto the motorcycle in order to allow use of the different backrest or luggage carrier devices. Consequently, modification of the motorcycle structure or the addition of additional components to the motorcycle, as well as well as some substantial installation procedures, are required for installing and using the devices disclosed in these patents.

It is desirable to provide a combination luggage carrier and backrest for a motorcycle, or similar vehicle, which overcomes the disadvantages of the prior art noted above, which is easy to install and remove, and which is relatively simple to manufacture.

SUMMARY OF THE INVENTION

It is an object of this invention to provide a device for enhancing the comfort of the operator of a two-wheeled vehicle, such as a motorcycle.

It is another object of this invention to provide a backrest support for the operator of a two-wheeled vehicle, such as a motorcycle.

It is an additional object of this invention to provide an improved combination backrest and storage compartment for a two-wheeled vehicle.

It is yet another object of this invention to provide a combination backrest/storage bag for the operator of a motorcycle or other two-wheeled vehicle which is easy to install and remove from the vehicle.

It is a further object of this invention to provide an improved combination motorcycle backrest and storage compartment assembly using a flexible storage bag incorporating a rigid frame.

In accordance-with a preferred embodiment of the invention, a combination backrest and storage compartment for a motorcycle and the like, having a driver's seat with a sissy bar or support bar spaced a predetermined distance behind the driver's seat, is provided. The storage compartment consists of a bag made substantially of flexible material having a front and a back, and dimensioned to fit in the space between the driver's seat and the sissy bar of the motorcycle. A rigid frame member has a front and a back interconnected by an elongated rigid brace; and the frame member is located inside the bag. At least one flexible strap member is attached to the bag and extends around the front of the bag to be secured to the sissy bar at the back of the bag to pull the bag and the frame, which is located in the bag, into secure engagement with the sissy bar.

DETAILED DESCRIPTION

Figure 1:
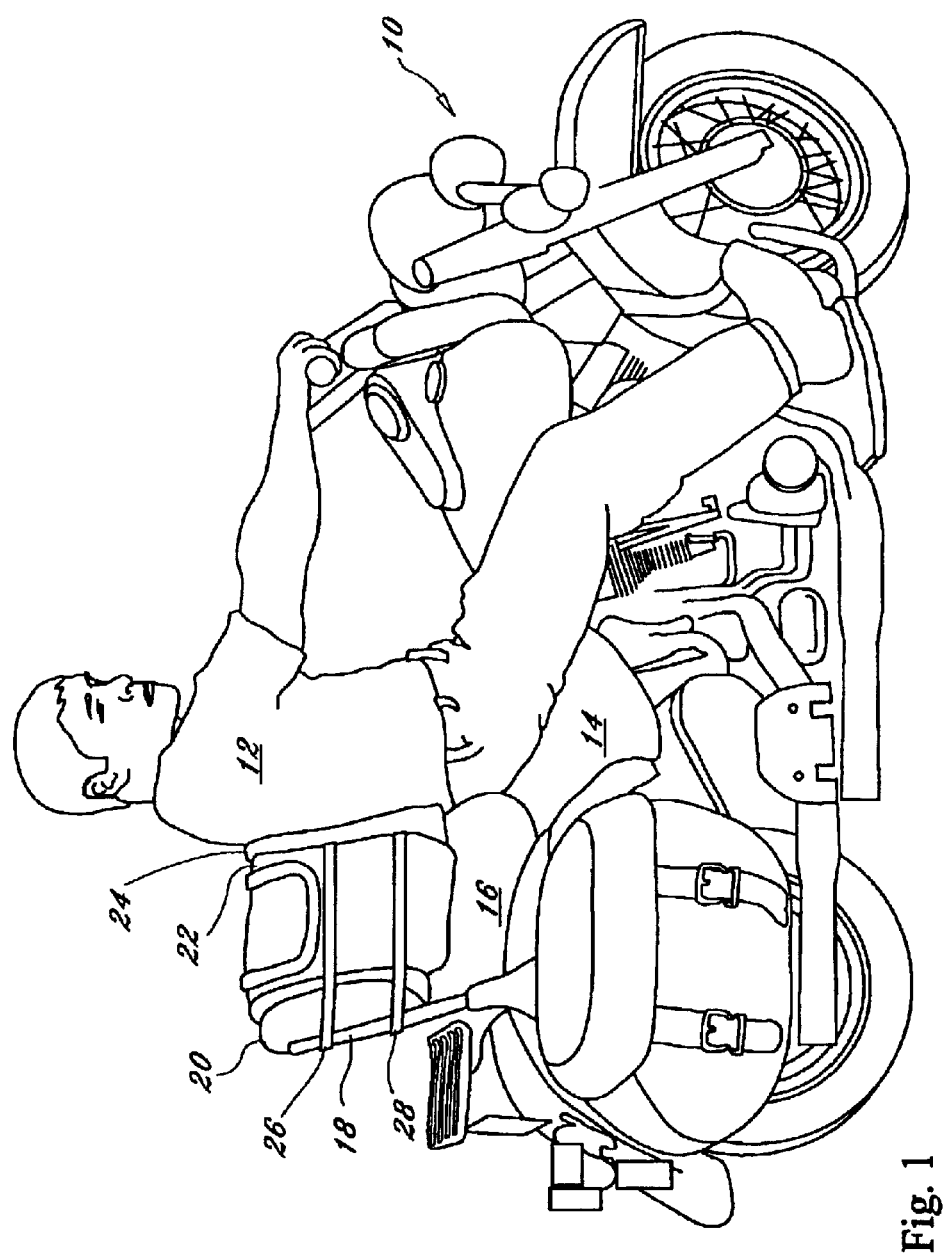
FIG. 1 is a side view of a motorcycle and its operator with a preferred embodiment of the invention shown in place in the position of use.

Reference now should be made to the drawings, in which the same reference numbers are used throughout the different Figures to designate the same or similar components. FIG. 1 illustrates the manner in which a preferred embodiment of the invention is used. As shown in FIG. 1, a motorcycle 10 has a rider or operator 12 seated on the rider's seat 14, in a position for operating the motorcycle. The seat 14 is located at or slightly behind the longitudinal center of the motorcycle 10, and frequently has a passenger seat 16 located over the rear wheel of the motorcycle at a slightly elevated position.

Behind the seat 16 is an elevated backrest or sissy bar 18, to which may be attached a padded backrest support 20. This is a construction which is relatively widely used, particularly with medium and large sized motorcycles.

A preferred embodiment of the invention is shown in the form of a combination backrest and storage container comprising a storage bag 22, to which a padded lumbar support backrest 24 is attached at the forward end, adjacent the back of the operator 12 of the motorcycle. The backrest storage compartment bag 22 is secured in place on top of the rear seat 16 of the motorcycle by means of a pair of elongated straps 26 and 28, which extend around the periphery of the bag 22 and the sissy bar 18. When the straps 26 and 28 are drawn tight, the backrest 24 storage compartment bag 22 are securely held in place on top of the seat 16 to locate the backrest 24 adjacent the back of the operator 12, and to provide storage in the space between the rear of the seat 14 and the sissy bar 18 for placement of clothes, supplies and other articles, as desired by the operator 12.

Figure 2:
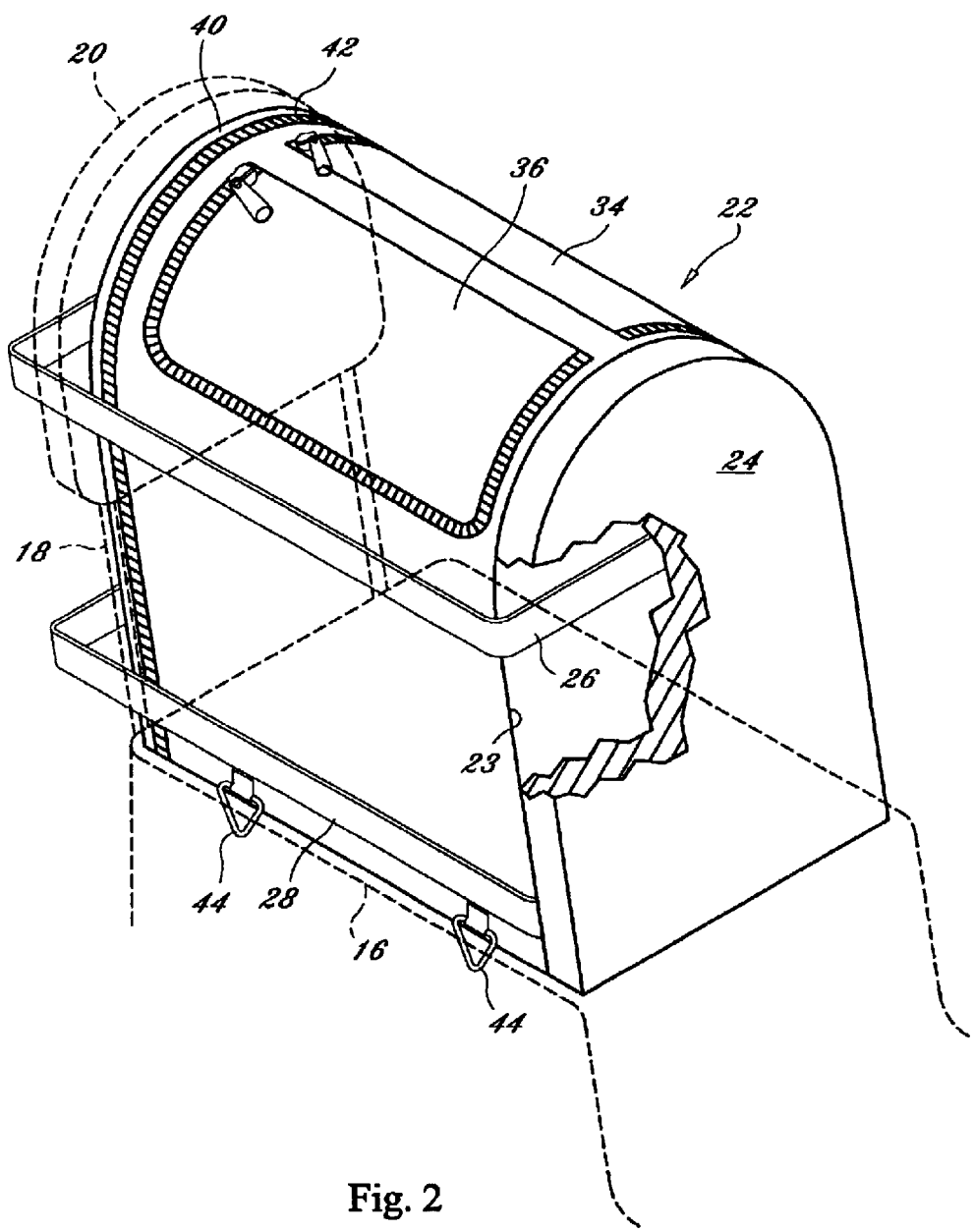
FIG. 2 is a partially cut away perspective view of a preferred embodiment of the invention.
Figure 3:
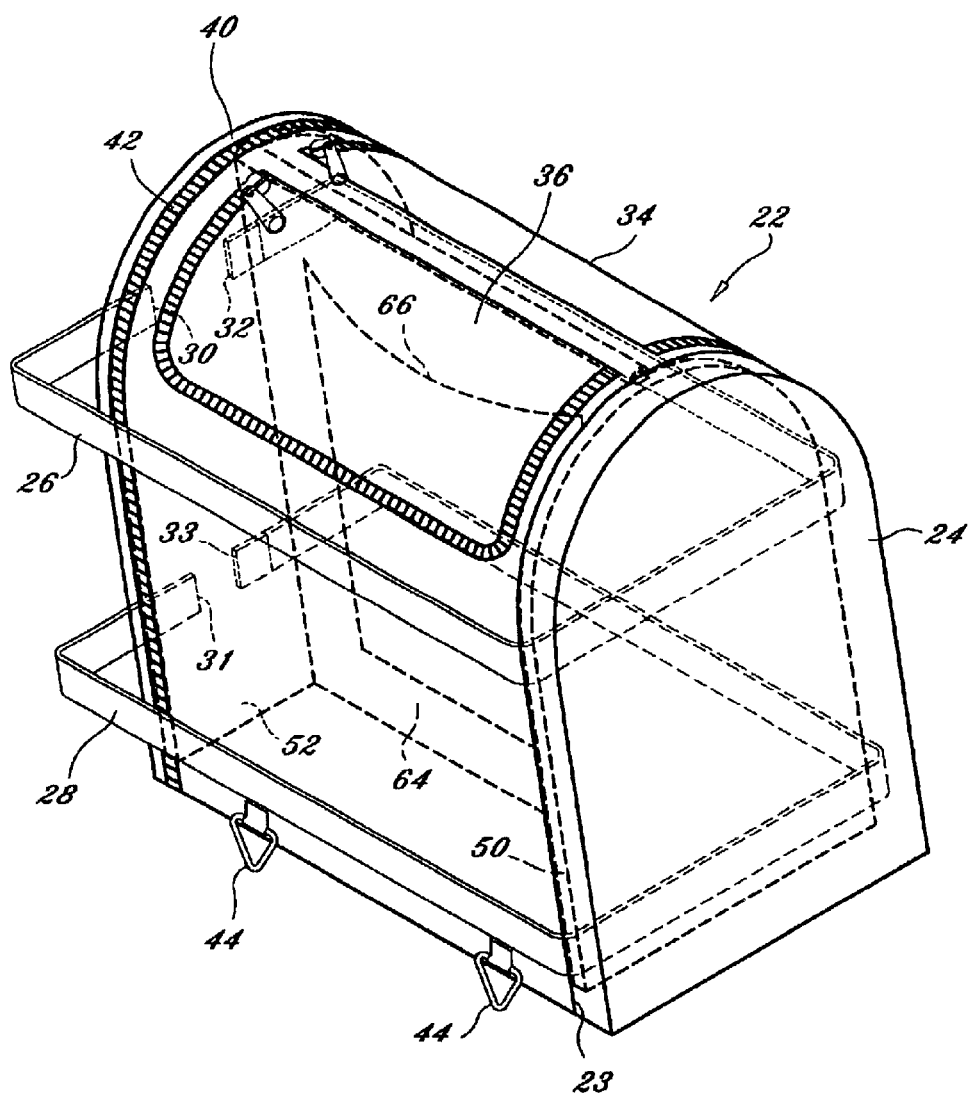
FIG. 3 is another more detailed perspective view of a preferred embodiment of the invention.

The remainder of the FIGS. of the drawings, namely Figures 2 through 8, illustrate details of the storage compartment/backrest assembly 22/24 of a preferred embodiment of the invention. FIGS. 2 and 3 are similar perspective views of a preferred embodiment, with FIG. 2 being a partially cut away perspective view showing the location of the assembly on top of the rear seat 16, and adjacent the sissy bar 18 and padded backrest 20 attached to the sissy bar, as shown in dotted lines in FIG. 2.

The storage compartment of a preferred embodiment of the invention is formed of flexible, high strength waterproof material in the form of a bag 22. The bag 22 has a substantially flat bottom which rests on top of the rear seat 16 of the motorcycle, and sides which extend upwardly and to curve over a rounded top, which has a pair of zippered closure flaps 34 and 36 on it, as illustrated in all of FIGS. 2,3 and 4. As shown most clearly in FIG. 4, the flaps 34 and 36 overlie substantially adjacent longitudinal halves of the bag 22 to allow access into the bag through the flaps 34 or 36, into one or the other of the two sides of the bag 22.

The front and back sides or front and rear ends of the bag 22 comprise front and back panels 23 and 40 in the general form of a rectangle, but which have rounded upper ends thereon, as seen post clearly in FIGS. 2 and 3. These panels are attached to the bottom, side and top covering panel of the bag 22 in any suitable fashion by means of stitching or other techniques commonly used to form flexible duffle bags and the like.

The back panel 40 is attached to the main body portion 22 of the bag by means of a zipper closure 42, which extends all the way from the bottom on one side to the bottom on the other side. This allows the panel 40 to drop open for purposes described subsequently. When the panel 40, however, is zipped closed onto the back or rear of the bag 22, the bag which has been described thusfar is configured in the general shape of a duffle bag or similar article.

The structure of the bag portion of the preferred embodiment is completed by means of a pair of encircling straps 26 and 28, which extend around the front panel 23 of the bag and along both sides in a direction substantially parallel to the plane of the bottom or base of the bag. The straps 26 and 28 are designed to extend beyond the back panel 40, for connection around the back of the sissy bar 18 (as shown in FIG. 1) by a suitable buckle arrangement. One version of such a buckle is illustrated generally, in FIG. 4, as including an end 20 inserted into a buckle part 32. The straps 26 and 28 typically are made of non-extendible webbing formed from nylon or other suitable materials, and may be of the type commonly used for automobile seat belts, for example. The straps 26 and 28 also include a conventional provision for extending them and allowing them to be pulled tight against the sissy bar 18 and/or the sissy bar backrest 18/20 illustrated in FIG. 1 and shown in dotted lines in FIG. 2. The manner in which this is done is by any conventional means.

As shown in the partially cut away portion of FIG. 2, and as indicated in dotted lines on the right-hand side of FIG. 3, the straps extend around the outside of the front panel 23 and the main body panel forming the bottom, sides and top of the bag 22. These straps may be secured to these panels throughout their length, or at strategic points such as at the junction between the front panel 23 and the main body portion of the bag 22, as well as adjacent the zipper 42, which attaches the rear panel 40 to the main portion of the body of the bag 22.

The final element of construction of the bag portion of the preferred embodiment is the attachment of a padded backrest or lumbar support 24 to the outside of the front 23 of the bag, as illustrated in solid lines in FIG. 2 and in dotted lines in FIG. 3. This attachment may be permanent; or it may be by means of releasable fasteners, such as hook-and-loop fasteners, snaps, zippers, or the like, in order to provide a backrest or lumbar support 24 adjacent the back of the operator 12 of the motorcycle as shown in FIG. 1.

Figure 5:
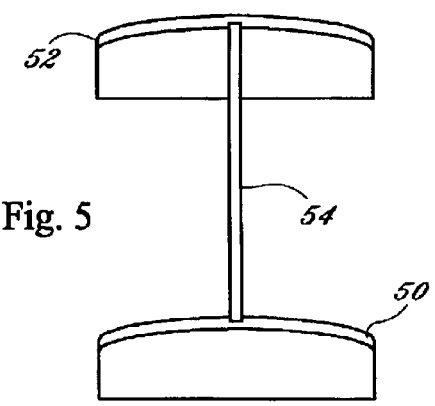
FIG. 5 is a top view of a component of a preferred embodiment of the invention.
Figure 6:
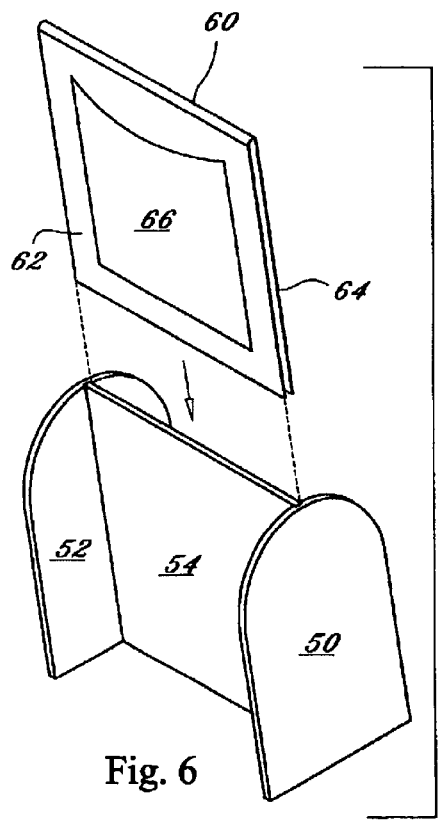
FIG. 6 is an exploded perspective view illustrating the manner of assembling an additional component of a preferred embodiment of the invention.
Figure 7:
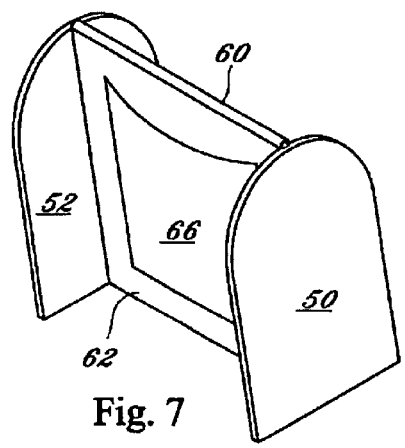
FIG. 7 is a perspective view showing the completion of the assembly shown in exploded form in FIG. 6.

To provide structural integrity to the combination backrest and storage bag, and to provide rigid support for the back of the rider 12 positioned as shown in FIG. 1, a rigid internal frame, illustrated most clearly in FIGS. 5,6 and 7, is provided. FIG. 5 is a top view and FIGS. 6 and 7 are perspective views of this frame. It can be seen that the frame comprises a front plate 50 and a rear plate 52, which are configured in the same rounded-top shape of the ends 23 and 40 of the bag 22. These plates are interconnected by means of a rigid brace or plate 54 in the shape of a parallelogram, which is located midway between the edges of the plates 50 and 52 and extends vertically from top to bottom, as shown most clearly in FIGS. 6,7 and 8B.

Figure 8A:
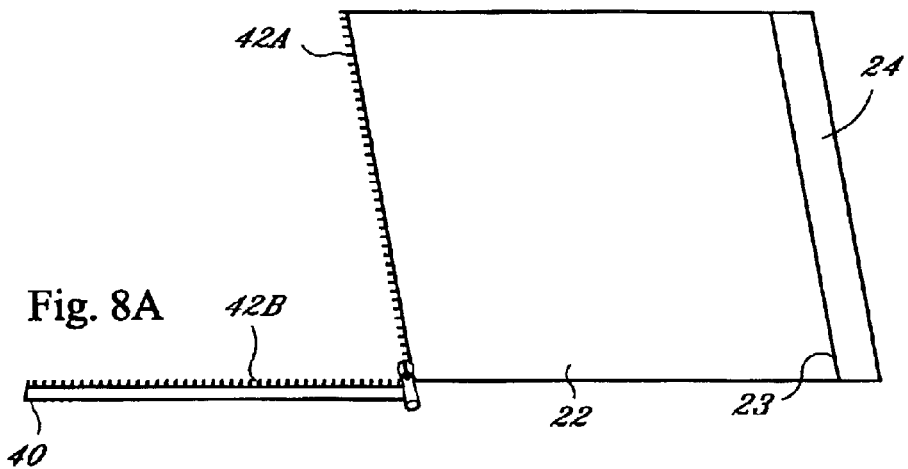
FIGS. 8A through 8C illustrate diagrammatically the manner of assembling various components of a preferred embodiment of the invention together.
Figure 8B:
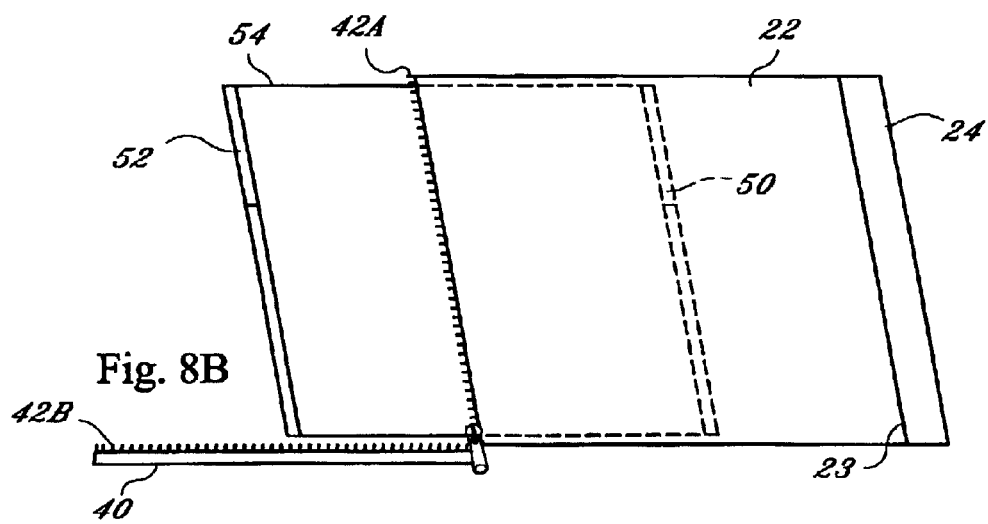

As indicated in FIGS. 5 and 8B, the frame comprising the front 50 and back 52 interconnected by the elongated rigid parallelogram brace 54 provides an angle of support for the backrest 24, and is conformed to the angular rearward tilt of the sissy bar 18 installed on the motorcycle. For different designs, this angle of tilt could be varied; and the angles of the back 54 and the front 50 of the frame do not necessarily need to be the same, although in most cases this angle will be the same. Thus, a true parallelogram interconnects the front 50 and the back 54 in a preferred embodiment of the invention. The relative angles between the elongated support brace 54 and the front 50 and back 52, however, can be varied to suit particular design requirements.

The frame 50/52/54 is comprised of rigid materials which may be wood, high-impact plastic, aluminum or any other suitable material. The frame parts 50/52/54 are securely interconnected together to form the configuration shown in FIGS. 5,6,7 and 8B. The rigid frame 50/52/54 provides sufficient strength to support the weight of an operator 12 pressing back on the lumbar support 24 when the motorcycle 10 is in use with the embodiment of the invention secured as shown in FIG. 1.

FIG. 6 illustrates another feature of the invention, which may be incorporated into the overall structure. This feature is a double-sided flexible insert panel or sheet 64 folded midway at a fold line 60, and including a pocket 66 (or several pockets, if desired) on each side. This insert panel 64 is slipped into position, as indicated in the exploded view of FIG. 6, to rest on the central rigid brace 54 of the frame, in the position shown in FIG. 7, to provide internal pockets, such as the pocket 66, when the assembly is completed.

Figure 8C:
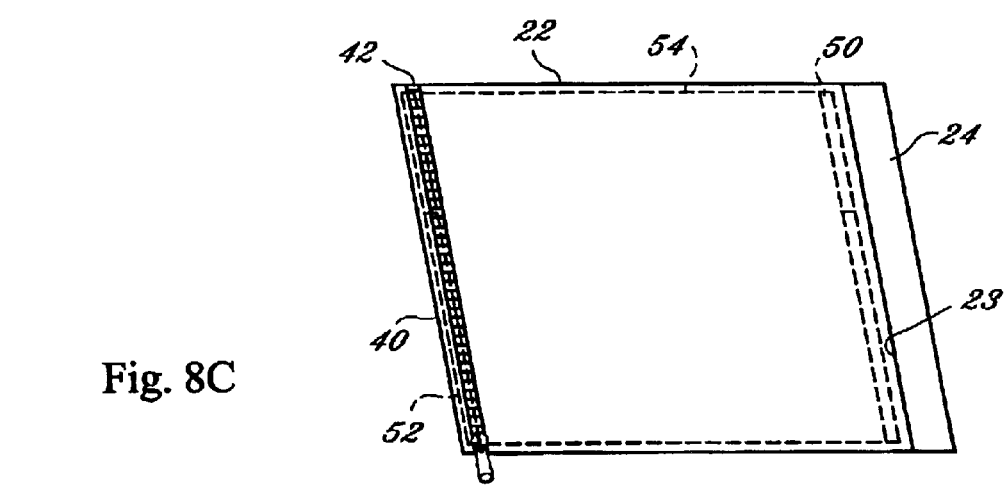

FIGS. 8A,8B and 8C illustrate the manner in which the frame of FIGS. 5,6 and 7 is inserted into the bag 22 to form the completed assembly. To do this, the bag 22 is opened at its back by opening the zipper portions 42A and 42B completely to allow the back 40 of the bag to drop down as shown in FIG. 8A. Then, the completed frame of FIGS. 5,6 and 7 is inserted through the opening, as illustrated in FIG. 8B, which shows the frame partially inserted into the bag 22. When the frame 50/52/54 is completely inserted into the bag, the zipper 42A,42B is closed, as shown in FIG. 8C, to secure the back 40 of the bag 22 in place as indicated. This also is shown in dotted lines in FIG. 3, and partially, in dotted lines, in FIG. 4.

Figure 4:
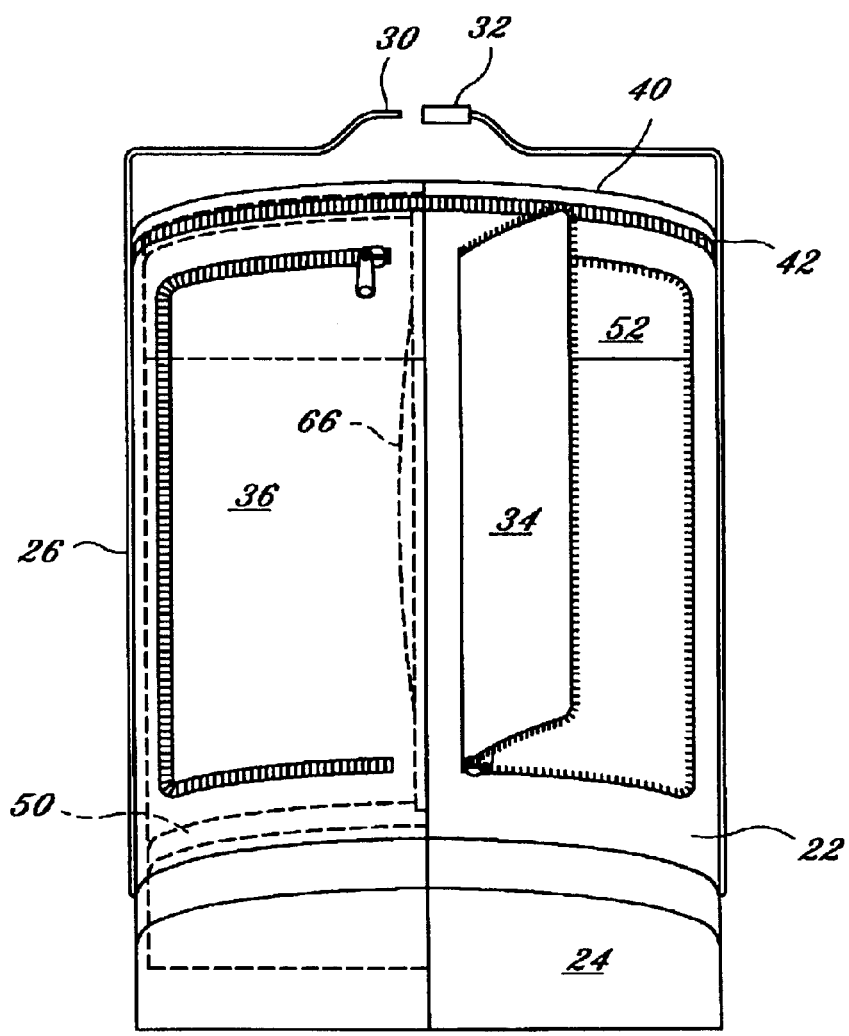
FIG. 4 is a top view of a preferred embodiment of the invention.

When the frame 50/52/54 is in place inside the bag, the bag attains a relatively rigid configuration in the form shown in FIGS. 2,3 and 4. The support brace 54 divides the bag longitudinally into two different parts, which are accessed through the different flaps 34 and 36, described previously. This is illustrated most clearly in FIGS. 3 and 4. It also is apparent from an examination of FIGS. 3 and 4 that when either of the flaps 34 and 36 are opened, access is available through the selected opening in the top of the bag to the internal pockets 66 on the insert 64.

When the frame 50/52/54 is in place as shown in FIGS. 3,4 and 8C, the entire backrest bag assembly may be placed on top of the seat 16 and secured to the seat in the manner described previously by tightening the straps 26 and 28 around the sissy bar 18. When the straps are pulled tight, the bag front 23 and the straps act on the frame 50/52/54 located within the bag to press the frame tightly into engagement with the sissy bar 18 (through the back 40), or the combined (sissy bar/backrest 18/20). It should be noted that the force for doing this does not merely pull on the rear portion of the bag, but rather the encircling straps 26 and 28 pull the entire assembly into engagement with the sissy bar 18 from front to back. The straps 26 and 28 also could pass over the exposed or front side of the lumbar support backrest 24, if desired; but the ideal construction is to place the backrest 24 over the straps 26 and 28, as shown most clearly in FIG. 2.

It should be noted that the straps 26 and 28 could, if desired, be attached to the interior of the bag 22 and the interior or inside side of the front 23 of the bag; but such a structure is considered less desirable than placing the straps around the outside, as illustrated in the various Figures of the drawing.

It also should be noted that while a central rigid brace in the form of a parallelogram plate 54 is shown as intercon-necting the front 50 and back 52 of the frame, an open configuration comprised of a pair of support braces located substantially along the center line of the front and back of the frame could be used; or support braces at the edges of the front 50 and back 52 could be employed. If support braces other than centrally located ones are employed, however, the ability to form dual compartments in the bag is lost, because access to the entire interior then would be available through either of the flaps 34 and 36 which have been illustrated. It further should be noted that the particular openings and number and location of different pockets can be varied as desired, in accordance with the particular environment in which the bag is to be used, or according to different desires of users of the bag. The ones shown are purely for illustrative purposes, and are not in any way to be considered limiting.

Likewise, the frame 50/52/54 could be inserted into the bag 22 entirely through a single opening in the top of the bag, without having the drop down feature of the back panel 40 of the bag employed. What is required, however, is that sufficient opening is provided in order to permit insertion and removal of the frame 50/52/54 as desired. By employing a removable frame, it is possible to use the bag as a carry on bag for travel without the frame, if desired.

It further should be noted that D-rings 44 are illustrated as connected to the bottom of the bag. Such D-rings may be provided on both sides of the bag to allow additional items to be strapped to the exterior of the bag on its sides or top, by means of cords, straps, or elastic fasteners, as desired. The D-rings 44, however, are not used to attach the bag/ backrest assembly to the motorcycle. The only connections which are employed are the straps 26 and 28, which provide a very secure attachment of the entire assembly to the motorcycle, and hold it in place against both vertical and lateral movement during operation of the motorcycle.

The foregoing description of the preferred embodiment of the invention is to be considered as illustrative and not as limiting of the invention. Various changes and modifications will occur to those skilled in the art for performing substantially the same function, in substantially the same way, to achieve substantially the same result without departing from the true scope of the invention as defined in the appended claims.

What is claimed is:

1. A combination backrest and storage compartment for a motorcycle, and the like, having a driver's seat with a sissy bar or support bar spaced a predetermined distance behind the driver's seat, the backrest and storage compartment including in combination:

a bag made substantially of flexible material having a front and a back, and dimensioned to fit in the space between the driver's seat and the sissy bar;

a rigid frame member having a front and a back, with the back connected to the front of the frame member by an elongated rigid brace, the frame member located inside the bag; and at least one flexible strap member attached to the bag and extending around the front thereof to be secured to the sissy bar to pull the bag and the frame located therein into secure engagement with the sissy bar.

2. The backrest and storage compartment according to claim 1 further including a padded backrest attached to the exterior of the front of the bag for location adjacent the driver's seat.

3. The backrest and storage compartment according to claim 2 wherein the front and the back of the rigid frame members are substantially rectangular, and the front and the back of the flexible bag are of substantially the same shape as the front and the back of the rigid frame member to fit thereover.

4. The backrest and storage compartment according to claim 3 wherein the elongated rigid brace comprises a rigid plate extending between the front and the back of the rigid frame member substantially perpendicular thereto.

5. The backrest and storage compartment according to claim 4 wherein the elongated rigid brace of the rigid frame member is located substantially midway between the sides of the bag to separate the interior of the bag into two compartments.

6. A backrest and storage compartment according to claim 5 wherein the rigid brace comprises a flat plate in the form of a parallelogram interconnected between the front and back of the rigid frame member.

7. A backrest and storage compartment according to claim 6 wherein the rigid brace of the rigid frame member causes the front and back of the rigid frame member to tilt rearwardly from the bottom thereof at a predetermined angle.

8. The backrest and storage compartment according to claim 7 further including a removable pocket member for placement over the rigid brace of the frame member within the bag.

9. The backrest and storage compartment according to claim 8 wherein the motorcycle has a passenger seat located between the driver's seat and the sissy bar; and the bag is designed to rest on the passenger seat.

10. The backrest and storage compartment according to claim 8 wherein the rigid frame member is a removable frame member.

11. The backrest and storage compartment according to claim 10 further including a closable opening in the bag to permit insertion of the rigid frame member into the bag, and to permit removal of the rigid frame member from the bag.

12. A backrest and storage compartment according to claim 11 wherein the opening in the bag into which the rigid frame member is inserted is located at the back of the bag.

13. The backrest and storage compartment according to claim 1 further including a padded lumbar support releasably attached to the outside of the front of the bag adjacent the driver's seat.

14. The backrest and storage compartment according to claim 1 wherein the motorcycle has a passenger seat located between the driver's seat and the sissy bar; and the bag is designed to rest on the passenger seat.

15. The backrest and storage compartment according to claim 1 wherein the rigid frame member is a removable frame member.

16. The backrest and storage compartment according to claim 15 further including a closable opening in the bag to permit insertion of the rigid frame member into the bag, and to permit removal of the rigid frame member from the bag.

17. A backrest and storage compartment according to claim 16 wherein the opening in the bag into which the rigid frame member is inserted is located at the back of the bag.

18. The backrest and storage compartment according to claim 17 wherein the elongated rigid brace of the rigid frame member is located substantially midway between the sides of the bag to separate the interior of the bag into two compartments.

19. A backrest and storage compartment according to claim 1 wherein the rigid brace comprises a flat plate in the form of a parallelogram interconnected between the front and back of the rigid frame member.

20. A backrest and storage compartment according to claim 19 wherein the rigid brace of the rigid frame member causes the front and back of the rigid frame member to tilt rearwardly from the bottom thereof at a predetermined angle.

21. The backrest and storage compartment according to claim 20 wherein the elongated rigid brace of the rigid frame member is located substantially midway between the sides of the bag to separate the interior of the bag into two compartments.

22. The backrest and storage compartment according to claim 1 wherein the front and the back of the rigid frame members are substantially rectangular, and the front and the back of the flexible bag are of substantially the same shape as the front and the back of the rigid frame member to fit thereover.

23. The backrest and storage compartment according to claim 1 wherein the elongated rigid brace comprises a rigid plate extending between the front and the back of the rigid frame member substantially perpendicular thereto.

24. A backrest and storage compartment according to claim 23 wherein the rigid brace comprises a flat plate in the form of a parallelogram interconnected between the front and back of the rigid frame member.

25. The backrest and storage compartment according to claim 24 further including a removable pocket member for placement over the rigid brace of the frame member within the bag.

26. A backrest and storage compartment according to claim 6 wherein the rigid brace of the rigid frame member causes the front and back of the rigid frame member to tilt rearwardly from the bottom thereof at a predetermined angle.

* * * * *